(12) United States Patent
Grunwald et al.

(10) Patent No.: US 9,809,054 B2
(45) Date of Patent: Nov. 7, 2017

(54) DECORATED RIGID PANEL

(71) Applicant: Kohler Co., Kohler, WI (US)

(72) Inventors: Steven Grunwald, Sheboygan, WI (US); Jonathan Kyle, Madison, WI (US); Robert D. Hill, Madison, WI (US)

(73) Assignee: KOHLER CO., Kohler, WI (US)

( * ) Notice: Subject to any disclaimer, the term of this patent is extended or adjusted under 35 U.S.C. 154(b) by 0 days.

(21) Appl. No.: 14/626,268

(22) Filed: Feb. 19, 2015

(65) Prior Publication Data

US 2015/0158329 A1 Jun. 11, 2015

Related U.S. Application Data

(62) Division of application No. 13/837,143, filed on Mar. 15, 2013.

(60) Provisional application No. 61/635,430, filed on Apr. 19, 2012.

(51) Int. Cl.
| | |
|---|---|
| *A47K 3/30* | (2006.01) |
| *B41M 5/382* | (2006.01) |
| *B44C 5/04* | (2006.01) |
| *B32B 5/24* | (2006.01) |
| *B41M 5/035* | (2006.01) |
| *B29C 43/20* | (2006.01) |

(52) U.S. Cl.
CPC .............. *B44C 5/0453* (2013.01); *A47K 3/30* (2013.01); *B29C 43/20* (2013.01); *B41M 5/0353* (2013.01); *B41M 5/38207* (2013.01); *B41M 5/38214* (2013.01); *Y10T 428/24612* (2015.01); *Y10T 428/24802* (2015.01)

(58) Field of Classification Search
CPC . B41M 5/38214; B41M 5/38207; A47K 3/30; A47K 3/302; A47K 3/34; A47K 3/36; A47K 3/362; B44C 5/0453; B44C 5/0446; Y10T 428/24802; Y10T 428/24612; B32B 5/24
USPC ......... 428/156, 172, 195.1, 430, 431, 542.2, 428/542.8, 297.7, 301.4
See application file for complete search history.

(56) References Cited

U.S. PATENT DOCUMENTS

| | | | |
|---|---|---|---|
| 3,379,592 A | 4/1968 | Ostrowicz | |
| 3,847,865 A | 11/1974 | Duggins | |
| 3,860,388 A | 1/1975 | Haigh | |
| 4,058,644 A | 11/1977 | DeVries et al. | |
| 4,059,471 A | 11/1977 | Haigh | |

(Continued)

FOREIGN PATENT DOCUMENTS

| | | |
|---|---|---|
| AU | 1187676 | 9/1977 |
| EP | 0333456 | 9/1989 |

(Continued)

OTHER PUBLICATIONS

Extended European Search Report dated Jul. 12, 2013 in EP Application No. 13164204.3-1704.

(Continued)

*Primary Examiner* — Joanna Pleszczynska
(74) *Attorney, Agent, or Firm* — Foley & Lardner LLP

(57) ABSTRACT

A panel includes a thermoset material, and an image comprising sublimation ink. The sublimation ink is absorbed in the thermoset material. The rigid component may be a rigid structure formed by the thermoset material. The panel may be for a bath or shower enclosure.

16 Claims, 2 Drawing Sheets

(56) References Cited

U.S. PATENT DOCUMENTS

| | | | | |
|---|---|---|---|---|
| 4,113,554 | A | 9/1978 | McGarry | |
| 4,169,907 | A * | 10/1979 | Barker | B44F 7/00 427/257 |
| 4,207,282 | A * | 6/1980 | Grisch | B29C 70/00 264/113 |
| 4,354,851 | A | 10/1982 | Hix et al. | |
| 4,362,529 | A | 12/1982 | Mizuno et al. | |
| 4,367,071 | A | 1/1983 | Mizuno et al. | |
| 4,406,662 | A | 9/1983 | Beran et al. | |
| 4,465,728 | A * | 8/1984 | Haigh | B41M 5/035 264/129 |
| 4,541,340 | A | 9/1985 | Peart et al. | |
| 4,664,672 | A | 5/1987 | Krajec et al. | |
| 4,874,564 | A | 10/1989 | Sudani | |
| 5,064,585 | A | 11/1991 | Cooper | |
| 5,824,116 | A | 10/1998 | Zutler | |
| 5,900,204 | A | 5/1999 | Wombwell | |
| 5,962,368 | A | 10/1999 | Poole | |
| 5,990,042 | A | 11/1999 | Mochizuki et al. | |
| 6,136,126 | A | 10/2000 | Fenzi | |
| 6,300,279 | B1 | 10/2001 | Macedo | |
| 6,332,941 | B1 | 12/2001 | Council et al. | |
| 6,335,749 | B1 | 1/2002 | Carizzoni et al. | |
| 6,596,116 | B2 | 7/2003 | Macedo | |
| 6,623,677 | B1 | 9/2003 | Smith et al. | |
| 6,676,792 | B1 | 1/2004 | Fenzi | |
| 6,814,831 | B2 | 11/2004 | Drake | |
| 6,964,722 | B2 | 11/2005 | Taylor et al. | |
| 6,998,005 | B2 | 2/2006 | Magee et al. | |
| 7,001,660 | B2 | 2/2006 | Garitano | |
| 7,022,202 | B2 | 4/2006 | Goertzen | |
| 7,033,973 | B2 | 4/2006 | Fenzi | |
| 7,077,926 | B2 | 7/2006 | Goffi | |
| 7,302,981 | B2 | 12/2007 | Benetton | |
| 7,338,066 | B2 | 3/2008 | Riepler | |
| 7,520,217 | B2 | 4/2009 | Roberts et al. | |
| 7,810,538 | B2 | 10/2010 | Magee et al. | |
| 8,011,922 | B2 | 9/2011 | Checcucci | |
| 8,012,290 | B2 | 9/2011 | Spengler | |
| 8,017,180 | B2 | 9/2011 | Macedo | |
| 2002/0100387 | A1 | 8/2002 | Churchwell | |
| 2004/0089407 | A1 | 5/2004 | Halewood | |
| 2005/0070434 | A1 | 3/2005 | Drake | |
| 2005/0227006 | A1 | 10/2005 | Segall | |
| 2007/0057404 | A1 * | 3/2007 | Hager | B29C 43/02 264/257 |
| 2007/0163057 | A1 | 7/2007 | Bertele et al. | |
| 2008/0230941 | A1 | 9/2008 | Williamson et al. | |
| 2008/0250558 | A1 * | 10/2008 | Torres | A47K 3/30 4/614 |
| 2010/0129621 | A1 | 5/2010 | Langan et al. | |
| 2011/0017402 | A1 | 1/2011 | Spengler | |
| 2011/0056617 | A1 | 3/2011 | Cagle | |
| 2011/0091690 | A1 | 4/2011 | Lin et al. | |
| 2011/0180294 | A1 | 7/2011 | Qin et al. | |
| 2011/0236644 | A1 | 9/2011 | Garitano | |
| 2012/0073737 | A1 | 3/2012 | Tsai | |

FOREIGN PATENT DOCUMENTS

| | | |
|---|---|---|
| EP | 437395 A2 | 7/1991 |
| EP | 0799681 | 10/1997 |
| EP | 0799681 A1 | 10/1997 |
| EP | 1108558 A2 | 6/2001 |
| EP | 1741567 | 1/2007 |
| FR | 2873620 | 2/2006 |
| FR | 2873621 A1 | 2/2006 |
| GB | 1463072 A | 2/1977 |
| GB | 2236710 A * | 4/1991 |
| JP | 10-128779 | 5/1998 |
| WO | WO1993004872 A1 | 3/1993 |
| WO | WO2002040289 A1 | 5/2002 |
| WO | WO2004035311 A2 | 4/2004 |
| WO | WO2008145649 A1 | 12/2008 |

OTHER PUBLICATIONS

Canadian Office Action for Application 2,812,668 dated Aug. 14, 2013. 2 pages.

Non-Final Office Action dated Apr. 22, 2015, 11 pages.

U.S. Office Action dated Apr. 15, 2016 from U.S. Appl. No. 13/837,143.

* cited by examiner

DECORATED RIGID PANEL

CROSS-REFERENCE TO RELATED PATENT APPLICATIONS

This application is a divisional of U.S. patent application Ser. No. 13/837,143, filed Mar. 15, 2013, which claims the benefit of and priority to U.S. Provisional Patent Application No. 61/635,430, filed Apr. 19, 2012, the entire disclosures of which are incorporated by reference herein.

BACKGROUND

The present disclosure relates to forming imagery on articles. More particularly, the present disclosure relates to forming and decorating panels or rigid components using a dye sublimation process.

Decorative images are often formed on various different articles, such as consumer products, clothing, packaging, signage, and the like. Images may include, for example, pictures, words, logos, patterns or other designs, alone or in combination with each other and/or many other possible images.

Many different methods have been employed to form images onto these various articles, such methods often being determined according to image and article characteristics (e.g., image durability, object shape and size, object material, etc.).

For example, various printing methods (e.g., inkjet printing, screen printing, etc.) have been used to form images with ink onto the various different substrates of particular items (e.g., plastic, metal, cloth, natural fibers, etc.). Depending on the article and image type, printing may offer various advantages or may suffer from various other disadvantages. For example, printing may offer flexibility and quick changeover for printing different images on similar articles (e.g., shirts). However, direct printing may require specialized equipment suited only for use with a particular item having unique characteristics (e.g., substrate material, size, shape, etc.), may provide limited durability since the ink is typically deposited on a surface of the article, and/or may require relatively long printing times and high expenses, especially associated with printing large items.

Another method for forming images on different articles is dye sublimation, which involves heating a specialized ink or dye that converts directly from a solid to a gas, such that the gaseous ink may be absorbed into the surface of the item. Dye sublimation generally involves providing a carrier or transfer film with an image formed thereon with sublimation ink, holding the carrier with the sublimation ink against the substrate with a low pressure (e.g., 5 or 10 psi), and heating the substrate and ink to a temperature at which the ink converts to a gaseous state and can be absorbed into the substrate. Dye sublimation may offer various advantages or suffer from various other disadvantages depending on the article and image type. For example, dye sublimation has been found to be useful on fabrics and small novelty items. However, dye sublimation typically requires heating an article to high temperatures (e.g., 400 degrees Fahrenheit) that may cause deformation to the article, requires specialized equipment (e.g., to heat an article and/or hold a carrier in fixed position against the article, such as a dye sublimation press, which typically operate at 60 psi or less), requires a polymeric substrate which often requires application of a gel coat or polymeric powder coat to the surface of the article for absorbing the gaseous sublimation ink, and is generally limited to two-dimensional surfaces.

One recent application includes construction sheet goods with simulated natural surfaces, such as stone (e.g., marble, granite, etc.) and wood, which may be used in construction projects in lieu of a corresponding naturally occurring material with higher cost and maintenance requirements. These sheet products are known to be imprinted using a dye sublimation process, such as that described above, but have been limited to cast polymers, ceramics, or metal that have required application and curing of a polymeric gel coat or powder coat and/or subsequent heating of the sheet product prior to transferring an image to the product.

It would be advantageous to provide an article with an image in a manner that addresses at least some of the shortcomings associated with conventional printing and dye sublimation methods.

SUMMARY

According to an exemplary embodiment, a panel includes a thermoset material, and an image formed using a sublimation ink. The sublimation ink is absorbed into the surface of the thermoset material. The panel may be a generally rigid structure formed by the thermoset material. The panel may be for a bath or shower enclosure.

According to an exemplary embodiment, a compression molded component includes a homogenous polymer-based substrate, and an image comprising a sublimation ink. The sublimation ink is absorbed in the homogenous polymer-based substrate. Glass fibers may be distributed generally evenly throughout the substrate. The compression molded component may be a generally rigid structure formed by the homogenous polymer-based substrate. The compression molded component may be a wall panel for a bath or shower enclosure.

According to an exemplary embodiment, a method for forming a compression molded component includes providing a compression molded component comprising a polymer-based substrate, providing a carrier with a transfer image comprising sublimation ink, and pressing the carrier against the rigid component at a pressure above approximately 100 psi and heating the sublimation ink to greater than approximately 330 degrees Fahrenheit. The step of providing a compression molded component may comprise forming the compression molded component by pressing a substrate material in a press, and heating the substrate material to a temperature of between approximately 300 and 350 degrees Fahrenheit until the substrate material becomes rigid. The step of pressing the carrier against the rigid component comprises inserting the carrier into the press prior to removing the compression molded component.

According to an exemplary embodiment, a decorated rigid structure includes a thermoset material and an image. The thermoset material forms a rigid structure. The image is on a surface of the rigid structure and includes sublimation ink absorbed in the thermoset material. 7.

According to an exemplary embodiment, a method of providing a decorated compression molded component includes placing a carrier with a transfer image onto the compression molded component. The compression image is formed of a sublimation ink. The method also includes transferring at least a portion of the sublimation ink to the compression molded component by pressing the carrier against the compression molded component at a pressure above approximately 100 psi and simultaneously heating the sublimation ink to between approximately 300 degrees Fahrenheit and approximately 360 degrees Fahrenheit until the sublimation ink sublimates and is absorbed into the compression molded component to form a transferred image thereon According to an exemplary embodiment, a method of forming a decorated compression molded component includes inserting uncured thermoset material between an upper tool and a lower tool. The upper tool and the lower tool having different three-dimensional surfaces for shaping the uncured thermoset material. The method also includes pressing the uncured thermoset material between the upper tool and the lower tool and simultaneiously heating the uncured thermoset material to shape and cure the thermoset material into the compression molded component. The method additionally includes inserting a carrier with an image between the compression molded component. The image is formed with a sublimation ink. The method includes pressing the carrier between the upper tool and the compression molded component until the sublimation ink sublimates and is sufficiently absorbed in the thermoset material to form an image on the compression molded component. The method still further includes removing the compression molded component from between the upper tool and the lower tool.

DETAILED DESCRIPTION

According to an exemplary embodiment, a member or structure, such as a modular bath or shower panel includes an image, which is formed with sublimation ink. The bath or shower panel comprises a polymer-based substrate and is formed by a compression molding process in which the substrate is compressed between two heated tools and heated until cured during a first pressing operation. The sublimation ink is applied to the panel by way of a carrier, which is compressed between the panel and the upper heated tool during a second pressing operation in which the sublimation ink is transferred from the carrier to the substrate of the panel.

Figure 1:
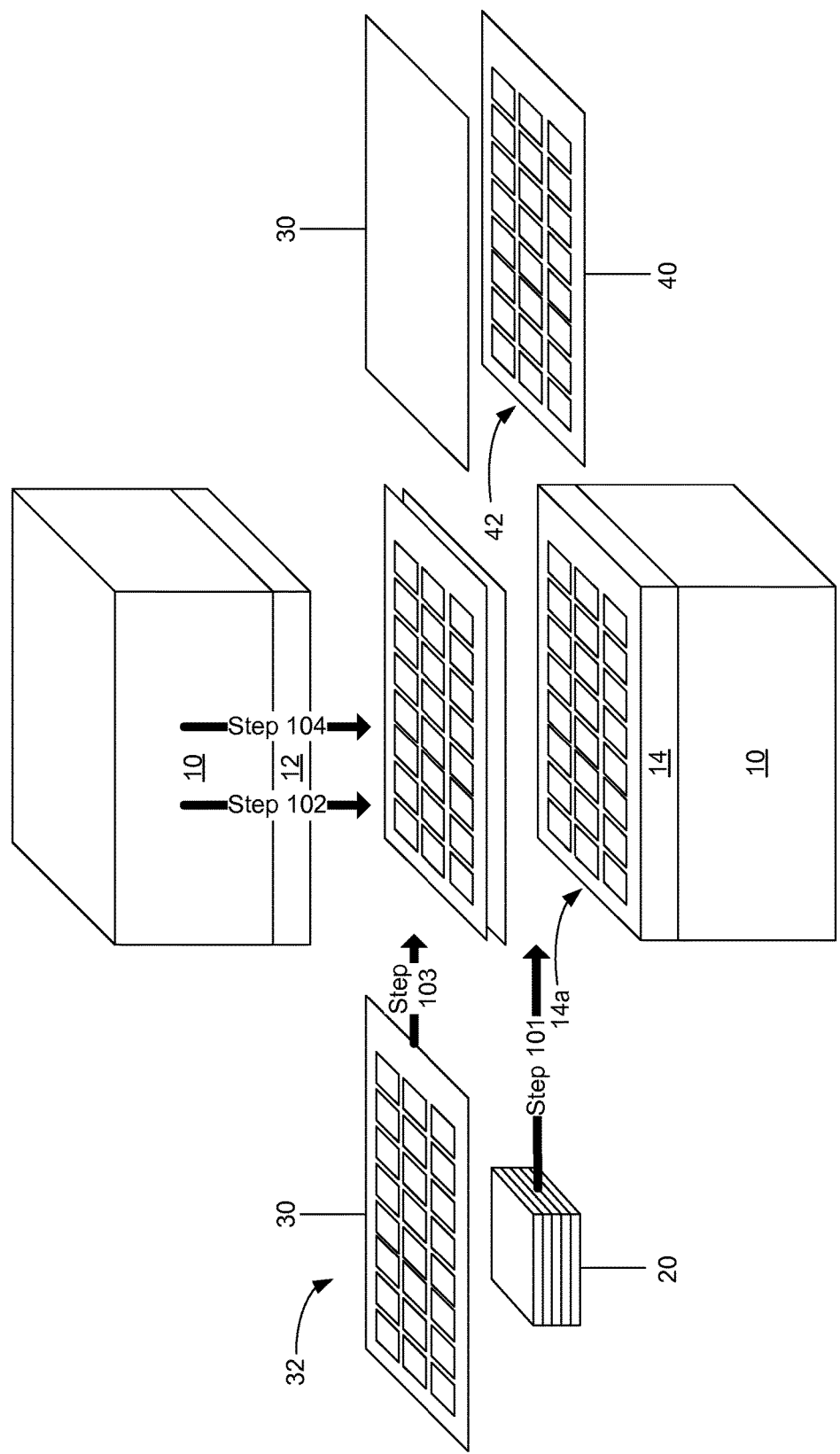
FIG. 1 is a schematic drawing illustrating components used for providing a rigid component with imagery in a dye sublimation process according to an exemplary embodiment.
Figure 2:
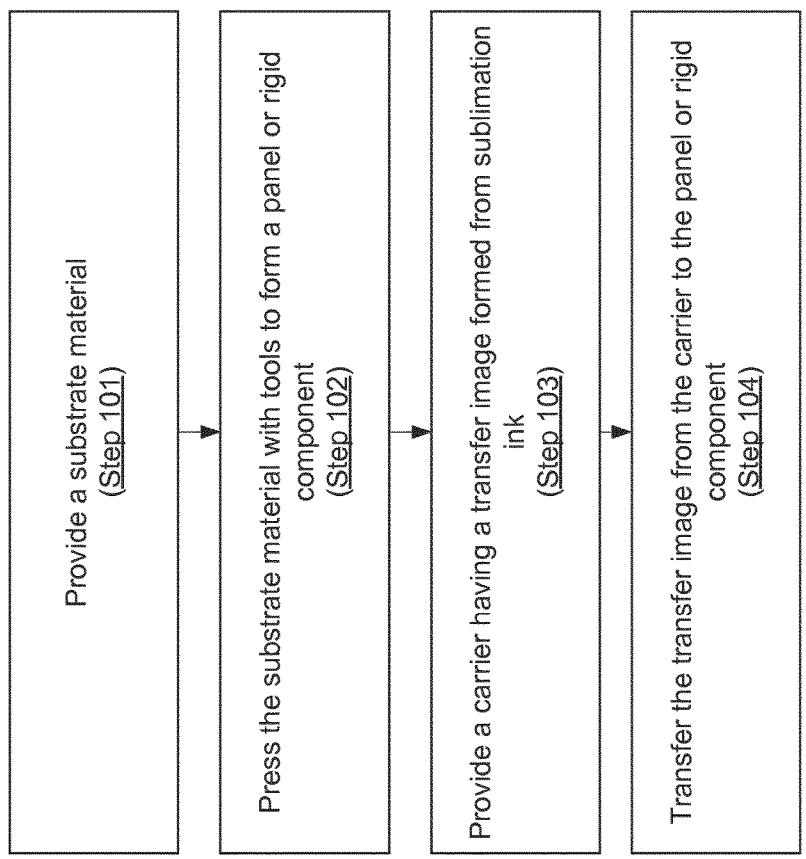
FIG. 2 is a flow chart of a method for providing a rigid component with imagery according to an exemplary embodiment.

According to an exemplary embodiment, a shower or bath includes one or more modular rigid components or panels 40, such as a wall panel, door, ceiling, shower receptor (i.e., a floor or base), tub base, and the like. The panels 40 are coupled to a generally hidden support structure and/or each other so as to define a bath or shower enclosure. The one or more panels 40 may be generally planar, or may include a three dimensional profile or shape configured for aesthetic, water shedding, or other purposes. According to the exemplary embodiment shown in FIG. 1, the panel 40 is a wall panel that may include a three-dimensional impression of tile and/or grout or other aesthetic designs.

According to other exemplary embodiments, the rigid component may be a shower receptor that is sloped and/or includes ledges to direct water toward a drain, a tub base that includes a recess or shelf for storing hygiene products, and the like. According to other exemplary embodiments, the rigid component may be a flat or planar panel or sheet, a sink (e.g., a lavatory, utility, or kitchen sink), bathtub, countertop, integrated sink and countertop (i.e., integrated top and bowl), or any other large format article for which it may be desirable to provide imagery.

According to an exemplary embodiment, the panel 40 or other rigid component comprises a substrate material having one or more polymeric constituent ingredients. The substrate material is formed from a generally homogeneous material, such as polymer-based thermoset material that is filled with glass fiber that is generally evenly distributed through within thermoset material. The thermoset material may include a polyester resin having one or more fillers materials (e.g., calcium carbonate) and may further include other minor constituent ingredients. The polyester resin may be provided in quantities of approximately 15-45% by weight (e.g., approximately 17-19%), while filler materials (e.g., calcium carbonate) may be provided in quantities of approximately 5-70% by weight, such as approximately 40-70% or approximately 62-64%. Glass content (e.g., chopped glass fibers) may, for example, be approximately 5-45% by weight, such as approximately 11-14%. According to other exemplary embodiments, the substrate material may include different polymer resin materials (e.g., acrylic, urethane, epoxy, vinyl esters, etc.), other fibrous strengthening materials carbon fiber, aramid fiber, polypropylene fiber (i.e., in addition to or instead of chopped glass fibers), other constituent ingredients of approximately 0-10% (e.g., pigment, catalyst, mold release, thickening agent, for controlling material shrinkage, for facilitating cross-linking, etc.), or other materials consistent with present disclosure as will be recognized by those skilled in the art.

According to an exemplary embodiment, the substrate material is provided in the form of a charge 20. The charge 20 is formed by providing a first layer of the homogeneous paste material, depositing chopped glass fibers over the first layer of paste material, and applying a second layer of past material over the glass fibers. After 1-7 days of thickening or maturing, the substrate material may then be folded over itself several times (e.g., five to ten times), thus resulting in a multi-layer charge 20 having smaller width and length (e.g., approximately 10-30"×10-30", such as approximately 18"×18") than the width and length of the final panel 40 or rigid component (e.g., approximately 2-10'×3-10', such as approximately 5'×5'). According to other exemplary embodiments, the charge 20 and panel 40 or other rigid component may be formed in other manners and other sizes consistent with the present disclosure as will be recognized by those skilled in the art.

According to an exemplary embodiment, the panel 40 or rigid component is formed by a compression molding process. The charge 20 is inserted into a press 10 between complementary upper and lower tools 12, 14 of a desired shape. Closing of the press 10 causes the upper and lower tools 12, 14 to compress the charge 20 causing the uncured substrate material to flow between the upper and lower tools 12, 14, resulting in a panel 40 of desired shape with glass fibers distributed generally evenly throughout the substrate material. The complementary upper and lower tools 12, 14 may have complementary three-dimensional impressions, which are configured to provide the panel 40 with a desired aesthetic appearance (e.g., tiles and grout), functional shape (e.g., for water direction, shelves, etc.), and/or additional features (e.g., strengthening or attachment features, such as ribs, bosses, flanges, apertures, etc.). If a three-dimensional shape is provided, the upper and lower tools 12, 14 may be configured to provide the panel 40 with a generally constant thickness, such that the contours of an outer aesthetic surface are followed by those of an inner hidden surface. The upper and lower tools 12, 14 may also be configured to form the panel 40 as a flat sheet (e.g., like conventional sheet goods used in the construction industry). As described above, a rigid component having different shape or purpose than a panel 40 may be formed including, for example, a bathtub, shower receptor, sink, integrated top and bowl, countertop, etc.

According to an exemplary embodiment, the upper and lower tools 12, 14 may be heated. For example, the upper and lower tools 12, 14 may each be made from a specialized steel or other suitable material and include fluid or gas conduits or piping running therethrough for carrying a heating liquid or gas, such as water or steam, or another liquid or gas. Heat is transferred from the liquid so as to heat the tools 12, 14, including their surfaces that directly engage the substrate material of the charge 20. Depending on the particular substrate material and its constituent ingredients, the upper tool 12 may be heated to between approximately 270 and 360 degrees Fahrenheit (e.g., between 315 and 345 degrees Fahrenheit), and the lower tool 14 may be heated to between approximately 270 and 360 degrees Fahrenheit (e.g., between approximately 285 and 315 degrees Fahrenheit). Furthermore, the upper and lower tools 12, 14 may be heated to different temperatures than each other (e.g., with a difference of between 15 and 45 degrees Fahrenheit, such as approximately 30 degrees Fahrenheit), for example, to facilitate curing of the substrate material 20, to achieve desired aesthetics of the panel 40, and/or to facilitate removal of the panel 40 from the press 10. According to other exemplary embodiments, the upper and lower tools 12, 14 may be configured in other manners, for example, with different materials, with different temperatures (e.g., higher, lower, lower or higher differential), and in other manners consistent with the present disclosure as will be recognized by those skilled in the art.

According to an exemplary embodiment, the press 10 is configured to press the upper and lower tools 12, 14 to a desired gap or spacing that corresponds to a desired thickness of the panel 40 or rigid component. For example, the lower tool 12 may be held in a fixed position, while the press 10 is configured to raise and lower the upper tool 12 over top the lower tool 14 to a generally constant spacing of between approximately between 110 and 500 thousandths of an inch (e.g., approximately 160-170 thousandths of an inch). The press 10 may, for example, be up to an approximately 4000 ton press capable of achieving maximum pressures of approximately 500-1800 psi. According to other exemplary embodiments, other presses may be used having other suitable parameters as will be understood by those skilled in the art.

According to an exemplary embodiment, the substrate material 20 is formed into the panel 40 or rigid component during a first pressing operation. That is, the panel 40 is a compression molded component formed during a compression molding process. The charge 20 is inserted into the press 10 (i.e., placed between the upper and lower tools 12, 14). The press 10 forces the upper tool 12 over the lower tool 14 to the desired spacing (i.e., the thickness of the panel), such that the substrate material of the charge 20 flows between the upper and lower tools 12, 14 to form the substrate material into the desired shape of the panel 40. Heat from the upper and lower tools 12, 14 cures the substrate material, so as to become rigid and form a generally rigid structure (i.e., the panel 40). For example, during the first pressing operation, the press 10 may compress the substrate material between approximately 500 psi and 1800 psi (e.g., between approximately 800 and 1200 psi) for a dwell time of between approximately 90 seconds and 10 minutes (e.g., approximately two to five minutes). The dwell time is configured to be sufficient for the substrate material to cure to form the panel 40 into a rigid component with longer dwell times generally required for thicker material. The press 10 then lifts the upper tool 12 to allow removal of the panel 40 for cooling, decorating, subsequent processing, packaging, etc. According to other exemplary embodiments, the first pressing operation may occur in other manners as will be recognized by those skilled in the art.

According to an exemplary embodiment, the panel 40 or rigid component includes imagery 42 formed from sublimation ink. A transfer image 32 is formed on a carrier 30 from which the sublimation ink is then transferred to the panel 40 during a decorating step or second pressing operation to form the final imagery 42 thereon. The final imagery 42 may, for example, be a geometric pattern, solid color, replication of a natural material (e.g., stone or wood), picture, logo or insignia, inscription, alone or in combination with each other or any other desirable image (e.g., the and grout, landscape or other picture, etc.).

According to an exemplary embodiment, the sublimation ink is configured to convert from a solid directly into a gas that can be absorbed by the panel 40 or rigid component (i.e., into the cured substrate material). The sublimation ink may, for example, be configured to sublimate (i.e., convert from a solid directly into a gas) at between approximately 375 and 425 degrees Fahrenheit at nominally atmospheric pressure or low pressures (i.e., within approximately 25 psi of atmospheric pressure). Exemplary sublimation inks are available under the trade names SubliM from Sawgrass Technologies, Inc. of Charleston, S.C., and Visi-Sub from Octi-Tech, Ltd. of Sheffield, United Kingdom. According to other exemplary embodiments, the sublimation ink may be configured to sublimate at other temperatures, such as between approximately 325 and 375 degrees Fahrenheit (e.g., approximately 350 degrees Fahrenheit), below 325 degrees Fahrenheit (e.g., approximately 284 degrees Fahrenheit), above 425 degrees Fahrenheit, or at any other suitable temperature.

According to an exemplary embodiment, the transfer image 32 is formed from sublimation ink on the carrier 30 (e.g., carrier layer, or transfer film). The carrier 30 may, for example, be paper (e.g., with a weight of between approximately 15 g/m$^2$ and 200 g/m$^2$, such as approximately 100 g/m$^2$), fabric, or a thin polymeric layer generally capable of withstanding temperatures at or above the sublimation temperature of the sublimation ink thereon without significant degradation or deformation. Heavier paper layers may advantageously carry higher ink densities. According to other exemplary embodiments, the carrier 30 may be configured in other manners consistent with the present disclosure as will be recognized by those skilled in the art.

According to an exemplary embodiment, the transfer image 32 may be formed on the carrier 30 according to any method suitable for both the sublimation ink and the carrier material. When deposited onto the carrier layer, the sublimation ink may be in a liquid form that subsequently dries into a solid layer. For example, the transfer image may be printed onto the carrier as a liquid using methods such as ink jet printing, offset printing, laser printing, or non-spraying methods, such as silk screening. According to other exemplary embodiments, the transfer image may be formed according to other methods as will be recognized by those skilled in the art.

According to an exemplary embodiment, the transfer image 32 and carrier layer 30 are configured according to the desired placement of the final image 42 on the panel 40 or other rigid component. For example, it may be desirable for the final image 42 to cover the entire outer or exposed surface of the panel 40. According to other exemplary embodiments, it may be desirable for the final image 42 to cover less than the entire outer surface of the panel 40. For example, the final image 42 may be restricted to between 40% and 80% of the outer surface (e.g., 60%), may be a broken image covering only select portions or regions of the exposed surface (e.g., corresponding to simulated tiles but not grout there between), may be provided on only generally coplanar portions of the panel 40 (e.g., raised tile portions), may be provided on non-coplanar portions having a generally smooth and/or continuous curvature (e.g., with a draft angle of approximately 1 degree or more, depth of approximately ¼" or less, etc.), such as raised tile portions and recessed grout portions. It also noted that, because the paper carrier 30 is generally not elastic, that the carrier 30 may sheer in non-planar regions during the second pressing operation, which is discussed in further detail below. Accordingly, the carrier 30 may be configured in other manners to accommodate these non-planar regions including, for example, providing coloring but not particular images in areas where the carrier 20 may sheer (e.g., grout lines, sharp features), not providing coloring in non-planar regions (e.g., no ink, cutout in the carrier, etc.). Furthermore, surfaces to be decorated should may be aligned generally orthogonal to tool travel in order to prevent movement of the carrier 30 when the press is closed (e.g., within approximately 10 degrees of orthogonal).

According to an exemplary embodiment, the sublimation ink of the transfer image 32 is configured to transfer to the panel 40 to form the imagery 42 with a desired appearance. The carrier layer 30 and substrate material have different properties and interact with the sublimation inks in different manners, such that the transfer image 32 on the carrier 30 may appear different than the final imagery 42 on the cured substrate material of the panel 40. More specifically, the transfer image 32 and final imagery 42 may appear different, because the sublimation ink is printed onto a surface of the carrier 30 (e.g., white paper) in liquid form to form a layer thereon, while the sublimation ink is transferred to the panel 40 in gaseous form and is absorbed into the cured substrate material 20 with different properties (e.g., coloring of the substrate material, translucency, etc.). Thus, in order to achieve a desired final imagery 42 of the panel 40, the transfer image 32 on the carrier 30 may be adjusted in color and saturation to achieve the desired final imagery 42 on the panel 40. For example, proper color and saturation of the sublimation ink may be determined by printing a sample transfer image 32 with multiple colors (e.g., squares of different colors), transferring the ink of the carrier image 32 to a blank of cured substrate material, evaluating color replication in the final image 42 and the transfer image 32 (e.g., comparing image characteristics of the final image with transfer image), evaluating ink absorbency of the cured substrate material (e.g., saturated capacity), and/or correspondingly adjusting the sublimation ink color and/or saturation of the transfer image 32 in order to provide the final image 42 with the desired appearance.

According to an exemplary embodiment, to transfer the transfer image 32 from the carrier 30 to the panel 40 or rigid component, the carrier 30 is positioned adjacent the panel 40 with the transfer image 32 against the outer, aesthetic surface of the panel 40 (i.e., image side down). The sublimation ink is then heated until it sublimates and the carrier 30 is held in position against the panel 40 for a duration sufficient for the sublimation ink, in gaseous form, to be absorbed by the substrate material to form the intended final imagery 42 of the panel 40. Generally speaking, shorter holding durations may result in lighter images, while longer holding durations may result in darker, more saturated images, since more sublimation ink may be absorbed into the substrate material and/or ink may also be absorbed deeper into the substrate surface. Furthermore, shorter holding durations may result in sharper images, while longer holding durations may result in image bleeding, since the additional sublimation ink may migrate laterally. Accordingly, the holding duration may be adjusted according to the desired final imagery 42 of the panel 40. According to one exemplary embodiment, the panel 40 is heated prior to application of the carrier 30, and the sublimation ink reaches its sublimation temperature due, at least in part, to heat transferred from the panel 40.

According to an exemplary embodiment, the transfer image 32 is transferred from the carrier 30 to the panel 40 or rigid component during a second pressing operation. Subsequent to the first pressing operation in which the panel 40 or other rigid component is formed and the substrate material is cured (as described above), the upper tool 12 is removed (i.e., lifted) from the upper surface of the panel 40, but the panel 40 is not removed from the lower tool 14. The carrier 30 is inserted image side down into the press 10 between the panel 40 and the upper tool 12. The carrier 30 is held in position with the transfer image 32 against the panel 40, for example, with electrostatic forces or physical holding devices. The upper tool 12 is then lowered by the press 10 over the carrier 30, panel 40, and lower tool 14, so as to compress the carrier 30 between the upper tool 12 and the panel 40. Heat from the panel 40 and the tools 12, 14 is transferred to the sublimation ink of the transfer image 32, which is heated until sublimating into a gaseous state for transfer and absorption into the substrate material of the panel 40. The carrier 30 may be compressed between the upper tool 12 and the panel 40 at pressures of between approximately 200 psi and 600 psi (e.g., between approximately 385 and 415 psi), or at any other suitable pressure. As described above, the holding or pressing duration or dwell time may be determined according to the desired final image (e.g., darkness and sharpness), which may also be influenced by temperature and pressure. For example, the decorating operation may utilize a dwell time of between approximately 30 seconds and ten minutes (e.g., between approximately and four minutes.

According to an exemplary embodiment, the carrier 30 is transferred into the press 10 via one or more machines. For example, a conveyor system and/or vacuum handler may be used to move and/or lift the carrier 30 into position in the press 10 and/or over the rigid component 10, and pistons or other actuators may be used to move the carrier against the rigid component 10 into precise placement. According to other exemplary embodiments, other means or methods may be used to insert the carrier 30 into the press 10 (e.g., hand placement).

Applicants unexpectedly discovered that by employing a second pressing operation, the sublimation ink may be heated to temperatures lower than those normally required for sublimation (e.g., within approximately 375-425 degrees Fahrenheit), while still achieving desired final image quality on the panel 40. Applicants believe that the lower temperatures in combination with substantially raised pressures still cause the sublimation ink to sublimate into a gaseous state for transfer to and absorption into the substrate material of the panel 40.

According to one exemplary embodiment, a sublimation ink that sublimates at approximately 375 to 425 degrees Fahrenheit at low pressure (e.g., within approximately 25 psi of atmospheric pressure) may render desired image quality on the panel 40 or rigid component while using a lower tool heated to approximately 300 degrees Fahrenheit, an upper tool heated to approximately 330 degrees Fahrenheit, and a pressure of between approximately 385 and 415 psi (e.g., approximately 400 psi). During the second pressing operation, the sublimation ink will reach a maximum temperature of approximately 330 degrees Fahrenheit (i.e., the temperature of the upper tool 12), but will still sublimate or otherwise be transferred into the substrate material of the panel 40 and achieve a final image 42 of desired quality. According to other exemplary embodiments, sublimation inks may be used that normally sublimate at different temperatures (e.g., as described above), the tools 12, 14 may be heated to other temperatures (e.g., higher, lower, and/or the same as each other), and the press may create other pressures (e.g., higher, lower, varying, and the like) in combination with each other and/or other suitable parameters consistent with the present disclosure.

According to an exemplary embodiment, a method is provided for providing a panel or rigid component with imagery. The method generally includes, providing a substrate material (Step 101), pressing the substrate material with tools to form the panel or rigid component (Step 102), providing a carrier having a transfer image formed from sublimation ink (Step 103), and transferring the transfer image from the carrier to the rigid component (Step 104). It should be understood that these steps and the substeps (described below) may be performed in any suitable order and/or combination, even eliminating one or more steps or substeps, in manners consistent with the present disclosure and/or as would be recognized by those skilled in the art.

According to an exemplary embodiment, the step of providing a substrate material (Step 101) may include one or more of the following substeps in any suitable combination: (a) providing a substrate material that comprises a homogeneous mixture comprising resin and filler (Step 101*a*); (b) providing a substrate material that is a polymer-based thermoset material (Step 101*b*); (c) providing a substrate material that comprises a polyester resin (Step 101*c*); (d) providing the substrate material with glass fibers (Step 101*d*); (e) providing the substrate material as a charge that has a smaller length and width than the panel or rigid component; and/or (f) placing a substrate material into a press between upper and lower tools (Step 101*f*).

According to an exemplary embodiment, the step of pressing the substrate material to form the rigid component (Step 102) may include one or more of the following substeps in any suitable combination: (a) heating the upper tool to between approximately 300 and 360 degrees Fahrenheit (e.g., between approximately 315 and 345 degrees Fahrenheit) (Step 102*a*); (b) heating the lower tool to between approximately 270 and 330 degrees Fahrenheit (e.g., between approximately 285 and 315 degrees Fahrenheit) (Step 102*b*); (c) heating the substrate material with the upper and/or lower tools (Step 102*c*); (d) compressing the substrate material between the upper and lower tools to a pressure of between approximately 500 psi and 1800 psi (e.g., between approximately 800 and 1200 psi) (Step 102*d*); (e) maintaining pressure and/or heat for a dwell time of between approximately 90 seconds and ten minutes to cure the substrate material (e.g., approximately two to five minutes) (Step 102*e*); (f) raising the upper tool to provide access to the panel or rigid component (Step 102*f*); and/or (g) removing the rigid component from the press (102*g*).

According to an exemplary embodiment, the step of providing a carrier having a transfer image thereon (Step 103) may include one or more of the following substeps in any suitable combination: (a) providing a paper, fabric, or polymer-based carrier; (b) forming a transfer image on a surface of the carrier with sublimation ink (Step 103*b*); (c) printing a transfer image onto a paper carrier using sublimation ink (Step 103*c*); (d) placing the carrier adjacent the panel or rigid component with the transfer image against a surface of the panel or rigid component (103*d*); and/or (e) placing the carrier into the press between the upper tool and the panel or rigid component after curing the substrate material in the press.

According to an exemplary embodiment, the step of transferring the transfer image from the carrier to the panel or rigid component (Step 104) may include one or more of the following substeps in any suitable combination: (a) heating the sublimation ink of the transfer image to the sublimation temperature of the sublimation ink (Step 104*a*); (b) holding the carrier adjacent the panel or rigid component for sufficient duration and temperature for the sublimation ink to be absorbed into the substrate material of the rigid component (e.g., between approximately 30 seconds and 4 minutes) (Step 104*b*); (c) and/or pressing the carrier between the upper tool and the panel or rigid component at pressures between approximately 200 and 600 psi (e.g., approximately 385-415 psi) (Step 104*c*).

Forming imagery on a bath or shower panel or other rigid component using the materials, equipment, and process described above may offer several advantages over conventionally-formed products, as well as the conventional formation processes formation, decoration, and dye sublimation, such as those described above.

For example, by associating image forming (i.e., decorating) with component formation, subsequent processing may be avoided. That is, by placing the carrier into the press prior to removal and cooling of the panel or rigid component, heat from the tools and panel or rigid component causes the ink to sublimate without requiring post-formation heating of the panel or rigid component. This is also advantageous over thermoplastic components, which may be formed using cool tools, such that the thermoplastic component would require subsequent heating.

By using existing compression molding equipment (i.e., press and tools for compression molding) for the decorating process without significant (or any) modification, the cost, space, and operation of additional equipment (e.g., heating and/or conventional dye sublimation equipment, specialized printers, etc.) may be avoided.

By using a polymer thermoset material, the sublimation ink may be absorbed directly into the panel or rigid component without application of an additional polymer powder or gel coat. Additionally, because the sublimation ink is absorbed directly into the polymer material of the rigid component, the final imagery may have greater durability than coated components and printed/painted images, which are formed generally as an outer layer on the surface of an article. Furthermore, thermoset components, which are cured under application of heat, are rigid and self-supporting at higher temperatures (e.g., sublimation temperatures) and, as such, do not require additional support or risk significant deformation as would thermoplastic components.

The disclosed dye sublimation process provides quicker (or instant) changeover of aesthetics as compared to other imagery methods by simply using a carrier with a different image. Furthermore, production volumes of decorated components may be scaled quickly with increases to carrier/transfer image throughput (i.e., by using more printers).

ILLUSTRATIVE EMBODIMENTS

While various embodiments of the present invention are discussed in detail herein, it should be appreciated that the present disclosure provides many applicable concepts that can be embodied in a wide variety of specific contexts. The specific embodiments discussed herein are merely illustrative of specific embodiments of the invention and do not delimit the scope of the invention.

According to an illustrative embodiment, a decorated rigid structure includes a thermoset material and an image. The thermoset material forms a rigid structure. The image is on a surface of the rigid structure and includes sublimation ink absorbed in the thermoset material. 7.

In the above illustrative embodiment, the rigid structure may be a wall panel for a bathing enclosure. The surface may surface may also face into the bathing enclosure.

In any of the above illustrative embodiments, the surface may be three dimensional.

In any of the above illustrative embodiments, the decorated rigid structure may not include a polymer layer formed on the thermoset material and in which the sublimation ink is absorbed.

In any of the above illustrative embodiments, the rigid structure may be a compression molded structure formed of the thermoset material. The thermoset material may also be homogenous.

In any of the above illustrative embodiments, the thermoset material may include generally evenly distributed reinforcing fibers.

In any of the above illustrative embodiments, the thermoset material may include generally evenly distributed filler material.

According to another illustrative embodiment, a method of providing a decorated compression molded component includes placing a carrier with a transfer image onto the compression molded component. The compression image is formed of a sublimation ink. The method also includes transferring at least a portion of the sublimation ink to the compression molded component by pressing the carrier against the compression molded component at a pressure above approximately 100 psi and simultaneously heating the sublimation ink to between approximately 300 degrees Fahrenheit and approximately 360 degrees Fahrenheit until the sublimation ink sublimates and is absorbed into the compression molded component to form a transferred image thereon In the above illustrative embodiment, transferring the sublimation ink may include heating the sublimation ink to between approximately 315 degrees Fahrenheit and approximately 345 degrees Fahrenheit.

In any of the above illustrative embodiments, transferring the image may include pressing the carrier against the compression molded component at a pressure between approximately 200 psi and approximately 600 psi.

Any of the above illustrative embodiments may further include forming the compression molded component. Forming the compression molded component may include inserting uncured thermoset material between an upper tool and a lower tool, and pressing the uncured thermoset material between the upper tool and the lower tool until the thermoset material is cured to form the compression molded component.

In any of the above illustrative embodiments, transferring the sublimation ink may include inserting the carrier between the upper tool and the compression molded component after the thermoset material is cured, pressing the carrier includes pressing the carrier between the upper tool and the compression molded component, and heating the sublimation ink includes heating the sublimation ink with the upper tool.

In any of the above illustrative embodiments, inserting the carrier may occur prior to removing the compression molded component from between the upper tool and the lower tool.

In any of the above illustrative embodiments, the upper tool may have a temperature of between approximately 300 degrees Fahrenheit and approximately 360 degrees Fahrenheit.

In any of the above illustrative embodiments, the upper tool may have a temperature of between approximately 315 degrees Fahrenheit and approximately 345 degrees Fahrenheit.

In any of the above illustrative embodiments, the lower tool may have a temperature that is between approximately 15 degrees Fahrenheit and 45 degrees Fahrenheit less than the temperature of the upper tool.

A wall for a shower enclosure may be made according to any of the above illustrative embodiments.

According to another illustrative embodiment, a method of forming a decorated compression molded component includes inserting uncured thermoset material between an upper tool and a lower tool. The upper tool and the lower tool have different three-dimensional surfaces for shaping the uncured thermoset material. The method also includes pressing the uncured thermoset material between the upper tool and the lower tool and simultaneiously heating the uncured thermoset material to shape and cure the thermoset material into the compression molded component. The method additionally includes inserting a carrier with an image between the compression molded component. The image is formed with a sublimation ink. The method includes pressing the carrier between the upper tool and the compression molded component until the sublimation ink sublimates and is sufficiently absorbed in the thermoset material to form an image on the compression molded component. The method still further includes removing the compression molded component from between the upper tool and the lower tool.

In the above illustrative embodiment, the compression molded component may not be removed from between the upper tool and the inner tool until after the image is formed on the compression molded component.

In any of the above illustrative embodiments, the upper tool may heat both the thermoset material and the sublimation ink.

In any of the above illustrative embodiments, the upper tool may heat an upper surface of the compression molded component to a temperature that is more than approximately 15 degrees Fahrenheit higher than a temperature to which the lower tool heats a lower surface of the compression molded component.

A wall panel for a shower enclosure may be made according to any of the above illustrative embodiments.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A modular shower wall, comprising:
    a rigid panel for use as a wall in a shower enclosure, the rigid panel formed from a substrate material; and
    an image on a surface of the rigid panel, the image comprising sublimation ink absorbed in the substrate material;
    wherein the substrate material is a charge comprising a first outer layer of a homogeneous paste material, a plurality of glass fibers disposed over the first outer layer, and a second outer layer of the homogeneous paste material disposed over the plurality of glass fibers;
    wherein the charge is folded a plurality of times to define a multi-layer charge having a smaller width and length than the width and length of the rigid panel; and
    wherein outer surfaces of the multi-layer charge do not include an additional material layer formed thereon and in which the sublimation ink is absorbed.

2. The modular shower wall of claim 1, wherein the substrate material defines a generally homogeneous, polymer-based thermoset material.

3. The modular shower wall of claim 2, wherein the rigid panel is a compression molded structure formed of the thermoset material.

4. The modular shower wall of claim 2, wherein the thermoset material comprises a polyester resin having one or more filler materials.

5. The modular shower wall of claim 1, wherein the rigid panel does not include a polymer layer formed on the substrate material and in which the sublimation ink is absorbed.

6. The modular shower wall of claim 1, wherein the surface faces into the shower enclosure.

7. The modular shower wall of claim 1, wherein the three-dimensional impression further includes non-coplanar portions.

8. The modular shower wall of claim 1, wherein the surface is an outer aesthetic surface; and wherein the rigid panel has a generally constant thickness.

9. The modular shower wall of claim 1, wherein the rigid panel is a large format article.

10. A modular panel for a shower enclosure, comprising:
    a thermoset material forming a rigid panel for use in a shower enclosure; and
    an image on a surface of the rigid panel, the image comprising sublimation ink absorbed in the thermoset material;
    wherein the rigid panel is formed by compression molding the thermoset material between an upper tool heated to a first temperature and a lower tool heated to a second temperature that is less than the first temperature, so as to facilitate curing of the thermoset material and to achieve a desired surface aesthetic of the rigid panel;
    wherein the thermoset material is charge comprising a first outer layer of a homogeneous paste material, a plurality of glass fibers disposed over the first outer layer, and a second outer layer of the homogeneous paste material disposed over the plurality of glass fibers;
    wherein the charge is folded a plurality of times to define a multi-layer charge having a smaller width and length than the width and length of the rigid panel; and
    wherein outer surfaces of the multi-layer charge do not include an additional material layer formed thereon and in which the sublimation ink is absorbed.

11. The modular panel of claim 10, wherein the surface is configured to face an interior of the shower enclosure.

12. The modular panel of claim 10, wherein the surface is an outer aesthetic surface; and wherein the rigid panel has a generally constant thickness.

13. The modular panel of claim 10, wherein the rigid panel is a large format article.

14. A shower enclosure, comprising:
    a plurality of modular panels configured to be coupled to each other to define an enclosure;
    wherein one or more of the plurality of modular panels comprises:
    a thermoset material forming a panel; and an image on a surface of the panel, the image comprising sublimation ink absorbed in the thermoset material;

wherein the thermoset material is a charge comprising a first outer layer of a homogeneous paste material, a plurality of glass fibers disposed over the first outer layer, and a second outer layer of the homogeneous paste material disposed over the plurality of glass fibers;

wherein the charge is folded a plurality of times to define a multi-layer charge having a smaller width and length than the width and length of the panel; and wherein outer surfaces of the multi-layer charge do not include an additional material layer formed thereon and in which the sublimation ink is absorbed.

15. The shower enclosure of claim 14, wherein the surface of the panel further includes a three dimensional profile configured for water shedding within the enclosure.

16. The shower enclosure of claim 14, wherein the one or more of the plurality of modular panels is a compression molded structure formed of the thermoset material.

\* \* \* \* \*